April 23, 1940.　　　H. M. HIESTER ET AL　　　2,198,386
VALVE
Filed Jan. 7, 1937　　　2 Sheets-Sheet 1

April 23, 1940. H. M. HIESTER ET AL 2,198,386

VALVE

Filed Jan. 7, 1937 2 Sheets-Sheet 2

Patented Apr. 23, 1940

2,198,386

UNITED STATES PATENT OFFICE 2,198,386

VALVE

Harry M. Hiester and Anthony P. Barcus, Dayton, Ohio, assignors to United Aircraft Products, Inc., Dayton, Ohio, a corporation of Ohio Application January 7, 1937, Serial No. 119,502

4 Claims. (Cl. 251—103)

This invention pertains to fluid control valves and comprises a leak proof multi-way valve of the rotary plug type which although especially designed for airplane use, is likewise readily applicable to many other purposes.

It is highly important that fuel line valves of airplanes be leak proof in order that fire hazards be reduced to minimum, and equally important that the seating surfaces be non-corrosive and capable of sealing under light pressure, thereby avoiding any tendency to stick and resist adjustment, and preventing damage and excessive wear of the engaging surfaces.

In the present construction there is contemplated a rotary valve body having an axial intake opening in constant communication with a supply conduit communicating with the valve housing and a lateral outlet port to be registered with any one of a series of discharge conduits communicating with the valve housing. The rotary valve body may be either cylindrical or tapered and peripherally engages, under compression, bodies of yielding packing material disposed thereabout in both peripherally and longitudinal circumferentially spaced relation. Spring tensioned indexing means serves to retain the valve body in either of its several positions of adjustment with the outlet port of the revoluble valve body in registry with a selected discharge conduit.

The object of the invention is to simplify the construction, as well as the means and mode of operation, of fluid control valves whereby they may not only be economically manufactured, but will be more efficient in use, of leak tight construction capable of being easily adjusted, of increased durability and unlikely to get out of repair.

A further object of the invention is to provide improved sealing means for such valves whereby leakage will be prevented, without creating undue resistance to adjustment.

A further object of the invention is to locate packing material most advantageously about the rotary valve body and in such relation as to prevent bypassing either from the supply conduit to either of the discharge conduits or from one of the latter to another.

A further object of the invention is to provide indexing means for yieldingly retaining the valve in any one of its several positions of adjustment.

A further object of the invention is to provide an improved non-corrodible valve seating construction.

A further object of the invention is to provide effective sealing of the valve under relatively light pressure.

A further object of the invention is to provide a rotary valve construction embodying the advantageous features of construction and meritorious characteristics herein mentioned.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings wherein is shown the preferred but not necessarily the only form of embodiment of the invention:

Like parts are indicated by similar characters of reference throughout the several views.

Figure 1:
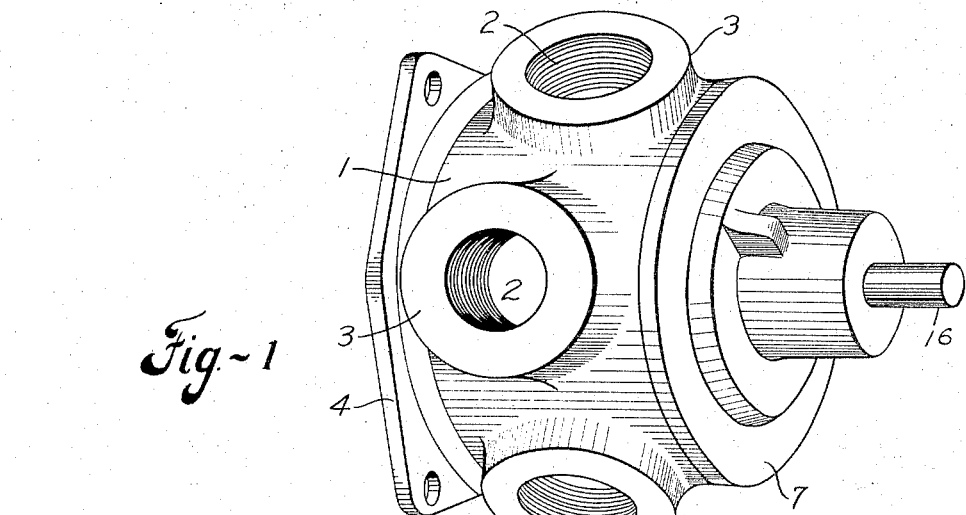
Fig. 1 is a perspective exterior view of the valve.
Figure 2:
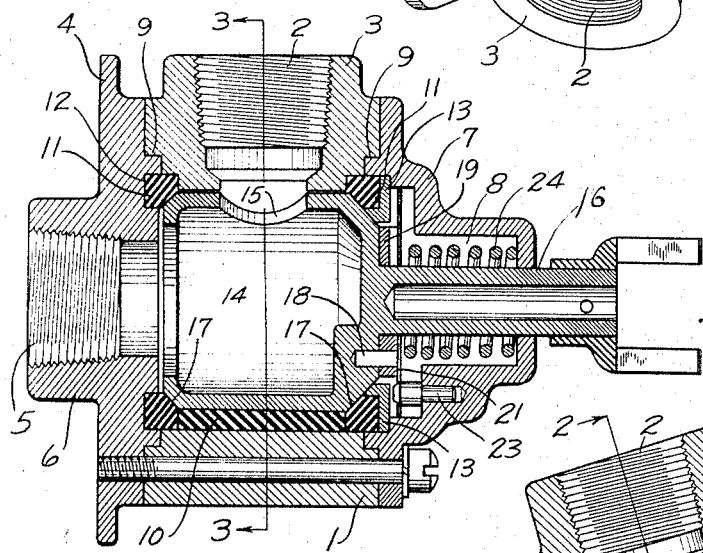
Fig. 2 is a transverse sectional view on line 2—2 of Fig. 3.
Figure 3:
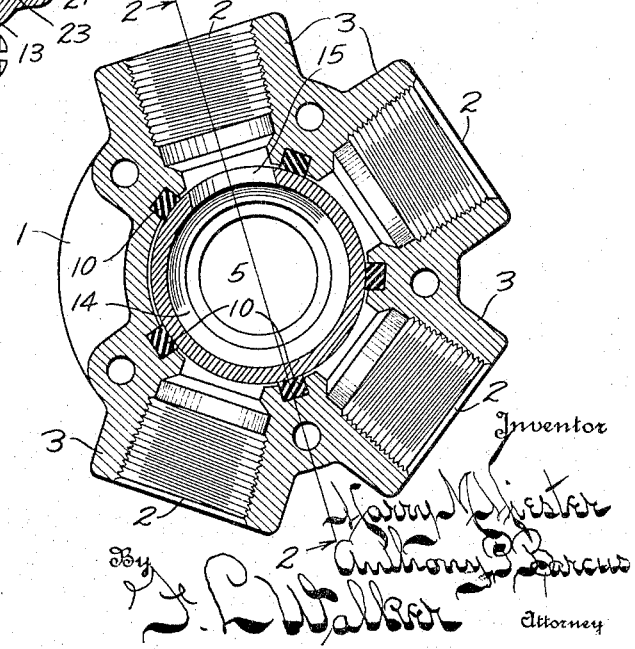
Fig. 3 is a longitudinal sectional view on line 3—3 of Fig. 2.

Referring to the accompanying drawings, 1 is an annular valve housing having a central chamber for a rotary plug element and in its peripheral wall a series of outlet openings 2 within radially disposed spaced bosses 3—3 for connection of discharge conduits. The interior chamber of the housing may be either cylindrical or tapered. The housing 1 preferably consists of aluminum or a metallic alloy of non-corrosive character, but may be of synthetic resinous or phenolic condensation material.

Secured to one end of the housing is a head 4 having therein a fluid inlet opening 5 within a connecting boss 6 for a supply conduit. Engaged with the opposite end of the housing is a second head 7 having therein an interior recess or spring chamber 8 and an opening for extension of the valve stem by which the rotor plug element is adjusted. The housing 1 and respective heads 4 and 7 are rabbeted at 9 to insure leak tight joints. The interior surface of the chamber within the housing is longitudinally grooved on circumferentially spaced lines to receive strips of compressible packing material 10. The several packing material grooves and inset strips are disposed at opposite sides and intermediate the outlet openings 2. Coincident with the angles formed by the intersection of the inner wall of the housing chamber and the respective heads 4 and 7 are interiorly beveled packing rings 11 of compressible material. One of these rings is seated in a groove 12 in the head 4. The other ring is seated upon a flanged or rabbeted collar 13 interiorly of the opposite head 7.

Mounted for rotary motion within the housing chamber is a hollow cup-shaped rotor plug 14, the open end of which communicates with the inlet opening 5 of the head 4. The cup-shaped rotor plug is provided with a lateral port 15 which may be brought into registry with any one of the several lateral discharge outlets 2 by rotation of the plug 14, which is provided with a valve stem 16 extending from the closed end thereof through the spring recess 8 in the head 7 and thence exteriorly thereof.

The rotary plug element 14 is beveled at 17 at each end to form thereon seats for the packing rings 11, the interior bevels of which conform thereto. The ends of the longitudinal packing strips 10 abut upon the packing rings 11 to insure leak tight contact throughout.

Figure 4:
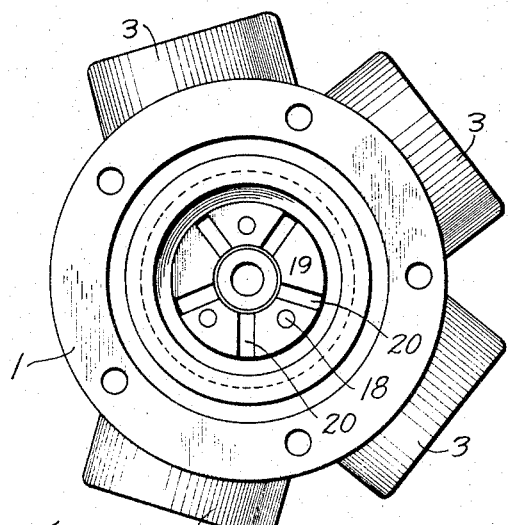
Fig. 4 is a detail end view with one of the housing heads removed.
Figure 7:
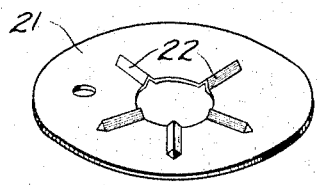
Fig. 7 is a perspective view of the plate member forming part of the valve indexing mechanism.
Figure 5:
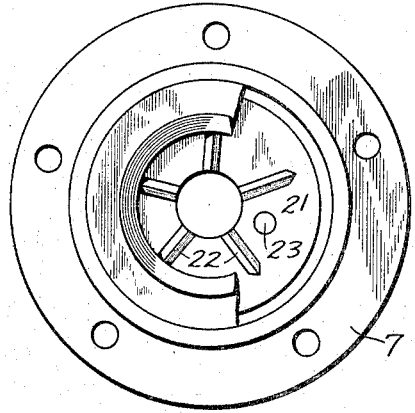
Fig. 5 is an end elevation of the removed head and associated parts.

Surrounding the valve stem 16 and secured to the rotor plug 14 for unison rotation by pins 18 is a disc 19 having therein spaced radial grooves 20, Fig. 4, the disposition of which corresponds with the relative location of the outlet ports 2. Surrounding the valve stem 16 immediately adjacent to the radially grooved disc 19 is a second disc 21 which may be stamped from sheet material having on its contiguous face a series of radial beveled ribs 22 spaced in accordance with the grooves 20 and releasably engageable therein to yieldingly hold the rotor plug 14 in any one of several positions of rotary adjustment.

This ribbed disc 21 is free to move axially relative to the disc 19 and rotor plug 14, but is held against rotary motion by a stud 23 projecting from the head 7 through a hole in the disc.

Enclosed within the chamber 8 of the head 7 and surrounding the valve stem 16 is a helical spring 24 under compression. The spring 24 duo-functionally urges the floating disc 21 toward the grooved disc 19 and the rotor plug axially against the packing ring 11 seated on the head 4. The spring pressure serves to maintain the interengagement of the ribs 22 in the grooves 20 from which they are disengageable against the yielding resistance of the spring 24 by the camming action of the beveled ribs 22. By rotation of the valve stem 16 the rotor plug 14 is adjusted within the housing to bring its lateral port into register with any one of the outlet ports 2 thereby connecting the inlet opening 5 with any selected discharge port, which adjustment is maintained by the inter-engagement of the ribs 22 in the grooves 20 under influence of the spring 24 until dislodged by further rotary adjustment.

Figure 6:
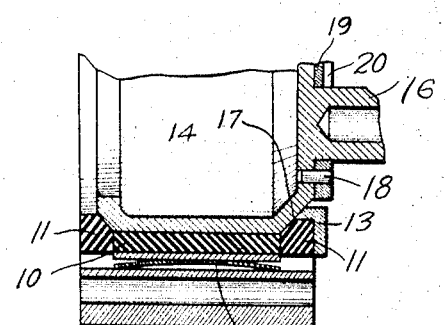
Fig. 6 is a fragmentary sectional view of the valve showing the cooperation between the rotor plug and the packing.

In event that the packing strips 10 wear, or lack sufficient elasticity, flat springs 25 may be inserted in the seat grooves beneath the strips 10, Fig. 6.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A multi-way valve including a housing having a central chamber and a series of fluid outlet openings in its peripheral wall, a rotary plug element within the central chamber, a head secured to one end of the housing and having therein a fluid inlet opening, a hollow cup-shaped rotor plug within the housing chamber, the plug having an open end which communicates with the inlet opening in the head secured to the end of the housing and a lateral port which may be brought into registry with any one of the outlets in the peripheral wall of the housing by rotation of the rotor plug, a stem on the rotor plug for rotary adjustment thereof, a head secured to the end of the housing opposite that end thereof to which the first named head is secured and having therein a spring chamber and an opening through which the rotor plug stem extends, the housing and the heads being rabbeted to insure leak-tight joints, circumferentially spaced longitudinal grooves on the surface of the chamber within the housing for receiving strips of compressible packing material, the grooves being disposed intermediate the outlet openings in the housing, an interiorly beveled packing ring of compressible material coincident with the angle formed at the intersection of the first mentioned head and the inner wall of the housing chamber and seated in a groove in the head, another packing ring of compressible material coincident with the angle formed by the intersection of the other head and the inner wall of the housing chamber and seated upon a rabbeted collar interiorly of such head, the packing rings abutting the ends of the strips of compressible packing material within the circumferentially spaced longitudinally disposed grooves in the surface of the housing chamber, a disc surrounding the valve stem and secured thereto for unison rotation, the disc having therein spaced radial grooves the disposition of which corresponds to the relative location of the outlet openings in the peripheral wall of the housing, a second disc surrounding the valve stem immediately adjacent the first named disc, such second disc being axially movable but non-rotatable and having on its contiguous face a series of radial ribs spaced in accordance with the radial grooves in the first named disc and releasably engageable therewith by axial movement of the second disc to yieldingly hold the rotor plug in any one of several positions of rotary adjustment, and a spring in the spring chamber and surrounding the valve stem, said spring being duofunctionally effective to urge the non-rotatable disc toward the rotatable disc secured to the rotor plug stem and to urge the rotor plug axially against the packing ring adjacent the opposite head secured to the housing.

2. A multi-way valve including a housing having a central chamber and a series of fluid outlet openings in its peripheral wall, a rotary plug element within the central chamber, a head secured to one end of the housing and having therein a fluid inlet opening, a hollow rotor plug within the housing chamber, the plug having an open end which communicates with the inlet opening in the head secured to the end of the housing and a lateral port which may be brought into registry with any one of the outlets in the peripheral wall of the housing by rotation of the rotor plug, a stem on the rotor plug for rotary adjustment thereof, a head secured to the end of the housing opposite that end thereof to which the first named head is secured and having therein a spring chamber and an opening through which the rotor plug stem extends, circumferentially spaced longitudinal grooves on the surface of the chamber within the housing for receiving strips of compressible packing material, the grooves being disposed intermediate the outlet openings in the housing, an interiorly beveled packing ring of compressible material coincident with the angle formed at the intersection of the first mentioned head and the inner wall of the housing chamber and seated in a groove in the head, another packing ring of compressible material coincident with the angle formed by the intersection of the other head and the inner wall of the housing chamber and seated upon a rabbeted collar interiorly of such head, the packing rings abutting the ends of the strips of compressible packing material within the circumferentially spaced longitudinally disposed grooves in the surface of the housing chamber, a disc surrounding the valve stem and secured thereto for unison rotation, the disc having therein spaced radial grooves the disposition of which corresponds to the relative location of the outlet openings in the peripheral wall of the housing, a second disc surrounding the valve stem immediately adjacent the first named disc, such second disc being axially movable but non-rotatable and having on its contiguous face a series of radial ribs spaced in accordance with the radial grooves in the first named disc and releasably engageable therewith by axial movement of the second disc to yieldingly hold the rotor plug in any one of several positions of rotary adjustment, and a spring in the spring chamber and surrounding the valve stem, said spring being duofunctionally effective to urge the non-rotatable disc toward the rotatable disc secured to the rotor plug stem and to urge the rotor plug axially against the packing ring adjacent the opposite head secured to the housing.

3. A multi-way valve including a housing having a central chamber and a series of fluid outlet openings in its peripheral wall, a rotary plug element within the central chamber, a head secured to one end of the housing and having therein a fluid inlet opening, a hollow rotor plug within the housing chamber, the plug having an open end which communicates with the inlet opening in the head secured to the end of the housing and a lateral port which may be brought into registry with any one of the outlets in the peripheral wall of the housing by rotation of the rotor plug, a stem on the rotor plug for rotary adjustment thereof, a head secured to the end of the housing opposite that end thereof to which the first named head is secured and having therein a spring chamber and an opening through which the rotor plug stem extends, circumferentially spaced longitudinal grooves on the surface of the chamber within the housing for receiving strips of compressible packing material, the grooves being disposed intermediate the outlet openings in the housing, a packing ring of compressible material coincident with the angle formed at the intersection of the first mentioned head and the inner wall of the housing chamber and seated in a groove in the head, another packing ring of compressible material coincident with the angle formed by the intersection of the other head and the inner wall of the housing chamber and seated upon a rabbeted collar interiorly of such head, the packing rings abutting the ends of the strips of compressible packing material within the circumferentially spaced longitudinally disposed grooves in the surface of the housing chamber, a disc surrounding the valve stem and secured thereto for unison rotation, the disc having therein spaced radial grooves the disposition of which corresponds to the relative location of the outlet openings in the peripheral wall of the housing, a second disc surrounding the valve stem immediately adjacent the first named disc, such second disc being axially movable but non-rotatable and having on its contiguous face a series of radial ribs spaced in accordance with the radial grooves in the first named disc and releasably engageable therewith by axial movement of the second disc to yieldingly hold the rotor plug in any one of several positions of rotary adjustment, and a spring in the spring chamber and surrounding the valve stem, said spring being duofunctionally effective to urge the non-rotatable disc toward the rotatable disc secured to the rotor plug stem and to urge the rotor plug axially against the packing ring adjacent the opposite head secured to the housing.

4. A multi-way valve including a housing having a central chamber and a series of fluid outlet openings in its peripheral wall, a rotary plug element within the central chamber, a head secured to one end of the housing and having therein a fluid inlet opening, a hollow rotor plug within the housing chamber, the plug having an open end which communicates with the inlet opening in the head secured to the end of the housing and a lateral port which may be brought into registry with any one of the outlets in the peripheral wall of the housing by rotation of the rotor plug, a stem on the rotor plug for rotary adjustment thereof, a head secured to the end of the housing opposite that end thereof to which the first named head is secured and having therein a spring chamber and an opening through which the rotor plug stem extends, circumferentially spaced longitudinal grooves on the surface of the chamber within the housing for receiving strips of compressible packing material, the grooves being disposed intermediate the outlet openings in the housing, a packing ring of compressible material coincident with the angle formed at the intersection of the first mentioned head and the inner wall of the housing chamber, another packing ring of compressible material coincident with the angle formed by the intersection of the other head and the inner wall of the housing chamber, the packing rings abutting the ends of the strips of compressible packing material within the circumferentially spaced longitudinally disposed grooves in the surface of the housing chamber, a disc surrounding the valve stem and secured thereto for unison rotation, the disc having therein spaced radial grooves the disposition of which corresponds to the relative location of the outlet openings in the peripheral wall of the housing, a second disc surrounding the valve stem immediately adjacent the first named disc, such second disc being axially movable but non-rotatable and having on its contiguous face a series of radial ribs spaced in accordance with the radial grooves in the first named disc and releasably engageable therewith by axial movement of the second disc to yieldingly hold the rotor plug in any one of several positions of rotary adjustment, and a spring in the spring chamber and surrounding the valve stem, said spring being duofunctionally effective to urge the non-rotatable disc toward the rotatable disc secured to the rotor plug stem and to urge the rotor plug axially against the packing ring adjacent the opposite head secured to the housing.

HARRY M. HIESTER.
ANTHONY P. BARCUS.